(12) United States Patent
Iwamoto et al.

(10) Patent No.: US 6,532,474 B2
(45) Date of Patent: Mar. 11, 2003

(54) APPARATUS AND METHOD FOR CARRYING OUT DATA LINKAGE AMONG A PLURALITY OF APPLICATIONS

(75) Inventors: Tsuyoshi Iwamoto, Nara (JP); Toshitaka Kaneda, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/190,241

(22) Filed: Nov. 13, 1998

(65) Prior Publication Data

US 2003/0014382 A1 Jan. 16, 2003

(30) Foreign Application Priority Data

Nov. 13, 1997 (JP) ............................................. 9-312024

(51) Int. Cl.7 ............................................. G06F 17/00
(52) U.S. Cl. ..................... 707/104.1; 707/101; 707/102
(58) Field of Search .................................. 707/101, 100, 707/102, 104.1, 530, 526; 709/310

(56) References Cited

U.S. PATENT DOCUMENTS

| | | | | |
|---|---|---|---|---|
| 4,553,206 A | * | 11/1985 | Smutek et al. | 707/101 |
| 5,495,565 A | * | 2/1996 | Millard et al. | 707/506 |
| 5,608,850 A | * | 3/1997 | Robertson | 395/127 |
| 5,692,194 A | * | 11/1997 | Nguyen et al. | 709/300 |
| 5,724,508 A | * | 3/1998 | Harple, Jr. et al. | 709/205 |
| 5,734,761 A | * | 3/1998 | Bagley | 382/309 |
| 5,781,687 A | * | 7/1998 | Parks | 386/52 |
| 5,897,650 A | * | 4/1999 | Nakajima et al. | 707/539 |
| 5,964,834 A | * | 10/1999 | Crutcher | 709/213 |
| 6,088,712 A | * | 7/2000 | Huang et al. | 707/526 |
| 6,195,091 B1 | * | 2/2001 | Harple et al. | 345/330 |
| 6,202,100 B1 | * | 3/2001 | Maltby et al. | 709/329 |

FOREIGN PATENT DOCUMENTS

JP 6-131199 A 5/1994

* cited by examiner

*Primary Examiner*—Safet Metjahic
*Assistant Examiner*—Uyen Le
(74) *Attorney, Agent, or Firm*—Nixon & Vanderhye PC

(57) ABSTRACT

The present invention is intended to arrange data, thereby improving usability and operability. When data desired to be stored is designated on an application being processed, a data capture control portion captures the data, and a data type judgment portion judges the type of the captured data. In accordance with the result of the judgment, the data is stored on an image clipboard or a text clipboard depending on the type of the data. Desired data is selected from among the stored data. A data paste control portion pastes the selected data on another activated application desired to be linked.

10 Claims, 12 Drawing Sheets

FIG. 4A

IMAGE CLIPBOARD  11-3

| IMAGE CLIPBOARD BUFFER | | | |
|---|---|---|---|
| BUFFER NO. | DATA | ATTRIBUTE INFORMATION CONTENT | LINK DESTINATION |
| 1 | IMAGE 1 | IMAGE ATTRIBUTE INFORMATION 1 | |
| 2 | IMAGE 2 | IMAGE ATTRIBUTE INFORMATION 2 | |
| 3 | IMAGE 3 | IMAGE ATTRIBUTE INFORMATION 3 | |
| | ... | ... | |
| | ... | ... | |
| m | IMAGE m | IMAGE ATTRIBUTE INFORMATION m | |

TEXT CLIPBOARD  11-4

| TEXT CLIPBOARD BUFFER | | | |
|---|---|---|---|
| BUFFER NO. | DATA | ATTRIBUTE INFORMATION CONTENT | LINK DESTINATION |
| 1 | TEXT 1 | TEXT ATTRIBUTE INFORMATION 1 | |
| 2 | TEXT 2 | TEXT ATTRIBUTE INFORMATION 2 | |
| 3 | TEXT 3 | TEXT ATTRIBUTE INFORMATION 3 | |
| | ... | ... | |
| | ... | ... | |
| n | TEXT n | TEXT ATTRIBUTE INFORMATION n | |

11-4-1  11-4-2  11-4-3  11-4-4

TEXT 1    1 2 3 4 5
TEXT 2    abcde
TEXT 3    ABCDE
  .         .
  .         .
TEXT n    /////

TEXT CLIPBOARD VIEW

| 1 2 3 4 5 | | |
|---|---|---|
| abcde | | |
| ABCDE | | |

IMAGE CLIPBOARD VIEW

APPARATUS AND METHOD FOR CARRYING OUT DATA LINKAGE AMONG A PLURALITY OF APPLICATIONS

BACKGROUND OF THE INVENTION

1. Field of the Invention

The present invention relates to an apparatus and method of information processing, in which data linkage is established among plural activated applications, and a recording medium readable by a computer, in which information processing programs are recorded.

2. Description of the Related Art

Regarding conventional information processing for establishing data linkage among plural applications, such as cut and paste, copy and paste, and data link, Japanese Unexamined Patent Publication JP-A 6-131199 has disclosed information processing for carrying out data linkage by storing plural pieces of data in a data buffer for establishing data linkage among plural applications, and by selecting designated data from among the plural pieces of data.

Conventionally, a clipboard, a kind of common memory, has been used for data exchange among plural applications. When data is selected on an application, and cut or copied, the data is transferred to the clipboard.

Next, an application to which the data is desired to be copied is made active, and pasting is carried out. As a result, the data on the clipboard is copied to the application.

The data having been transferred to the clipboard once remains therein until different data is further transferred to the clipboard. Therefore, pasting can be carried out any number of times.

On the other hand, in the case of the above-mentioned method of using the clipboard, only one piece of data is retained. Therefore, when plural pieces of data are desired to be pasted separately by using this method, cut and paste operations must be carried out over and over again.

To solve this problem, the above-mentioned prior art employs a method of storing data in plural buffers when carrying out cut or copy operation.

However, since plural pieces of text data and image data are stored, the above-mentioned method has a problem of causing a difficulty in understanding at the time of pasting because of different types of data being present on the clipboard.

SUMMARY OF THE INVENTION

In order to solve the above-mentioned problem, an object of the present invention is to provide an apparatus and method of information processing, and a recording medium stored with an information processing program, readable by a computer, wherein a clipboard for text data and a clipboard for image data are separately used, whereby even if one type of data (image data for example) is stored frequently on one clipboard, the other type of data (text data for example) is not affected at all because the clipboards are separately used depending on the type of the data, thereby ensuring easy-to-understand simple processing operations.

The invention provides an information processing apparatus capable of carrying out data linkage among a plurality of activated applications, the apparatus comprising:

designating device for designating data desired to be stored on an activated application which is currently in execution;

judging circuit for judging a type of the data designated by the designating device;

storage circuit for storing a plurality of pieces of data by type of data on the basis of a result of the judgment by the judging circuit;

selecting device for selecting a desired data from among the plurality of pieces of data stored in the storage circuit; and reading circuit for reading the data selected by the selecting device on another activated application desired to be linked.

In accordance with the invention, when data desired to be stored is designated on an activated application, the type of the designated data is judged, and the data is stored on the basis of the type of the data which is obtained as a result of the judgement. Furthermore, when desired data is selected from among stored data, the selected data is read on another activated application which is desired to be linked and different from the activated application which is currently in execution. Therefore, data can be stored by type of data such as text data and image data, whereby different types of data are adversely affected by each other and data can be arranged properly. Usability and operability can thus be improved.

Furthermore, in the invention it is preferable that the storage circuit stores data in the order of storage designated by the designating device.

In accordance with the invention, data is stored in the storage circuit in the designated order. Therefore, stored data can be identified chronologically and can be subject to processing, such as deletion.

Furthermore, an information processing apparatus further comprises deleting circuit for deleting data stored in the storage circuit, in chronological order from the oldest data, when a residual of storage capacity of the storage circuit becomes insufficient.

In accordance with the invention, data is stored in the storage circuit in the designated order. When a residual of storage capacity becomes insufficient, data is deleted in chronological order, that is, the oldest data is deleted first. Therefore, it is possible to reserve an area for storing new data.

The invention further comprises dividing circuit for dividing the data designated by the designating device by type of data when the designated data is judged as including a plurality of pieces of data by the judging circuit, wherein the storage circuit stores the plurality of pieces of divided data by type of data together with information for synchronization among the data.

In accordance with the invention, when data including both text data and image data is designated for example, the data is divided into text data and image data, and each piece of divided data is stored on the basis of the type of the data together with the information for synchronization among the data. Therefore, processing operation can be carried out simply and speedily.

Furthermore, the invention further comprises deleting circuit for deleting data stored in the storage circuit, the deleting circuit, when specific data is deleted, also deleting a different type of data specified by the synchronization information of the deleted specific data.

In accordance with the invention, when, for example, text data is deleted, image data specified by the synchronization information of the deleted data is also deleted. Therefore, data deletion can be carried out simply and easily.

Furthermore, the invention further comprises deleting circuit for deleting data stored in the storage circuit, the deleting circuit, when specific data is deleted, not deleting a different type of data specified by the synchronization information of the deleted specific data.

In accordance with the invention, when, for example, text data is deleted, image data specified by the synchronization information of the deleted data is not deleted. Therefore, useful data can be reserved.

Furthermore, the invention provides a method of information processing for establishing data linkage among plural activated applications, the method comprising the steps of:

designating data desired to be stored on an activated application which is currently in execution;

judging a type of the data designated at the designating step;

storing a plurality of pieces of data by type of data on the basis of a result of the judgment at the judging step;

selecting a desired data from among the plurality of pieces of data stored at the storing step; and reading the data selected at the selecting step on another activated application desired to be linked.

According to the invention, the method of information processing is applicable to the information processing apparatus, which can store data by type of data such as text data and image data, whereby different types of data are not adversely affected by each other and data can be arranged, thereby offering higher usability and operability.

Furthermore, the method of information processing further comprises a step of dividing the data designated at the designating step by type of the data when the designated data is judged as including a plurality of pieces of data at the judging step, wherein the storing step stores a plurality of pieces of divided data by type of data together with information for synchronization among the data.

According to the invention the method of information processing is applicable to the information processing apparatus, wherein when, for example, data including both text data and image data is designated, the data is divided into text data and image data, and each piece of divided data is stored by type of data together with the information for synchronization among the data, whereby processing operation can be carried out simply and speedily.

Furthermore, the invention provides a recording medium stored with an information processing program, readable by a computer, for establishing data linkage among a plurality of activated applications, which recording medium is stored with a program for making a computer execute a method of information processing comprising the steps of:

designating data desired to be stored on an activated application which is currently in execution;

judging a type of the data designated at the designating step;

storing a plurality of pieces of data by type of data in accordance with a judgment result at the judging step;

selecting a desired data from among the plurality of pieces of data stored at the storing step; and reading the data selected at the selecting step on another activated application desired to be linked.

According to the invention the recording medium readable by a computer stored with a program for making a computer execute a method of information processing wherein data can be stored by type of data such as text data and image data, whereby different types of data are adversely affected by each other, and data can be arranged, thereby offering higher usability and operability.

Furthermore, the invention provides a recording medium, readable by a computer, stored with an information processing programs for establishing data linkage among plural activated applications, the recording medium being stored with a program for making a computer execute a method of information processing comprising the steps of:

designating data desired to be stored on an activated application which is currently in execution;

judging a type of the data designated at the designating step;

dividing the data designated at the designating step by type of the data, when the designated data is judged to include plural pieces of data at the judging step;

storing a plurality of pieces of divided data by type of data together with information for synchronization among the data;

selecting a desired data from among the plurality of pieces of data stored at the storing step; and reading the data selected at the selecting step on another activated application desired to be linked.

According to the invention the recording medium readable by a computer, stored with a program for making a computer execute a method of information processing wherein, when, for example, data including both text data and image data is designated, the data is divided into text data and image data, and each piece of divided data is stored on the basis of the type of the data together with the information for synchronization among the data, whereby processing operations can be carried out simply and speedily.

BRIEF DESCRIPTION OF THE DRAWINGS

Other and further objects, features, and advantages of the invention will be more explicit from the following detailed description taken with reference to the drawings wherein:

FIG. 4A is a table showing the contents of the image clipboard buffer 11-3, and FIG. 4B is a table showing the contents of the text clipboard buffer 11-4;

DETAILED DESCRIPTION OF THE PREFERRED EMBODIMENTS

Figure 1:
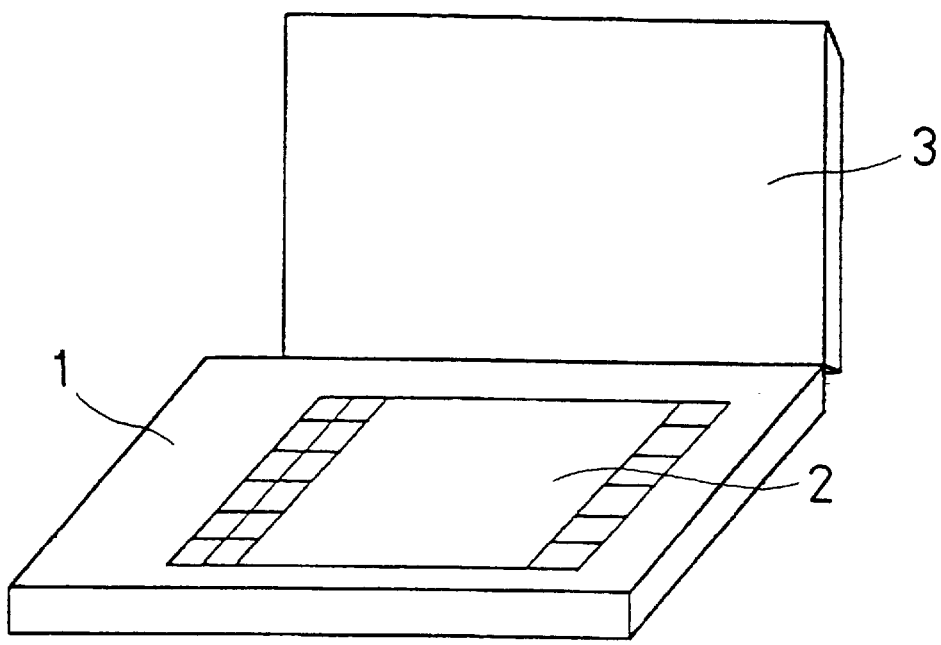
FIG. 1 is a perspective external view showing an information processing apparatus provided with a clipboard for text data and a clipboard for image data separately in accordance with an embodiment of the present invention.

Now referring to the drawings, preferred embodiments of the invention are described below.

FIG. 1 is a perspective external view showing an information processing apparatus provided with a clipboard for text data and a clipboard for image data separately in accordance with the present invention.

Referring to FIG. 1, this information processing apparatus comprises a main unit cabinet portion 1 and a lid portion 3.

The main unit cabinet portion 1 has an input/output portion 2, an infrared communication portion (not shown), a pen holder portion and the like, and accommodates a power supply portion for supplying power to portions required to be powered, such as control circuits for controlling the input/output portion 2, the infrared communication portion and interfaces.

The lid portion 3 is hinged to the rear end of the cabinet 1, and is made rotatable so as to cover the input/output portion 2, thereby protecting the input/output portion 2 while the apparatus is carried.

Figure 2:
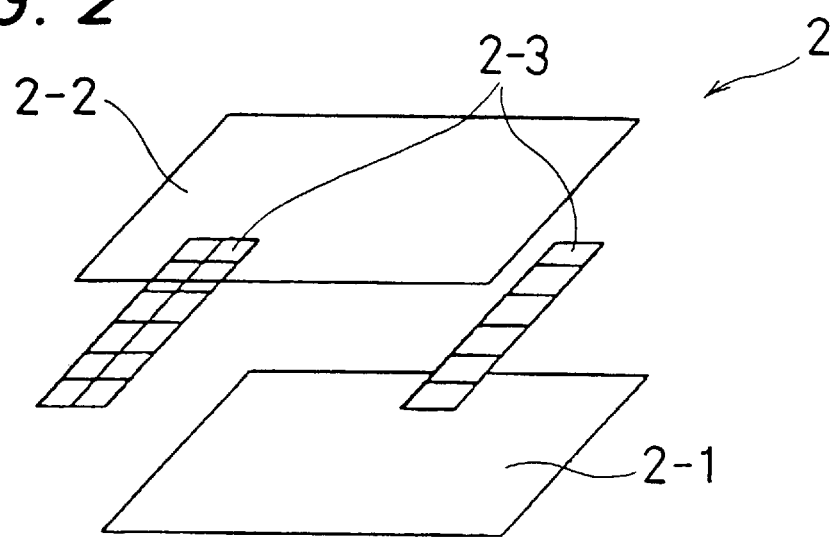
FIG. 2 is an exploded perspective view showing the input/output portion 2 of the information processing apparatus.

FIG. 2 is an exploded perspective view showing the input/output portion 2.

Referring to FIG. 2, the input/output portion 2 is an integration of a liquid crystal display portion 2-1 and a transparent tablet portion 2-2.

The liquid crystal display portion 2-1 is a thin type based on a matrix system which is capable of displaying text data. A backlight formed of an EL (electroluminescent) panel or the like may be provided on the back side of the liquid crystal display portion 2-1 as required.

The transparent tablet portion 2-2 has such a size as to cover the liquid crystal display portion 2-1. In the transparent tablet portion 2-2, transparent electrodes are provided on the inner sides of two transparent sheets, for example, small projecting spacers are printed regularly so as to prevent the electrodes from making contact with one another under normal conditions. When a position is designated by a finger or a pen, the transparent electrodes facing each other at the designated position make contact with each other so that the selected position can be detected on the transparent tablet portion 2-2.

Films 2-3 on which fixed keys are marked are inserted between the liquid crystal display portion 2-1 and the transparent tablet portion 2-2. Functions to be used frequently are printed on the films 2-3 by using easy-to-understand symbols.

The position selected by the user on the liquid crystal display portion 2-1 can be detected by synchronizing the content displayed on the liquid crystal display portion 2-1 with the position information of the transparent tablet portion 2-2.

Figure 3:
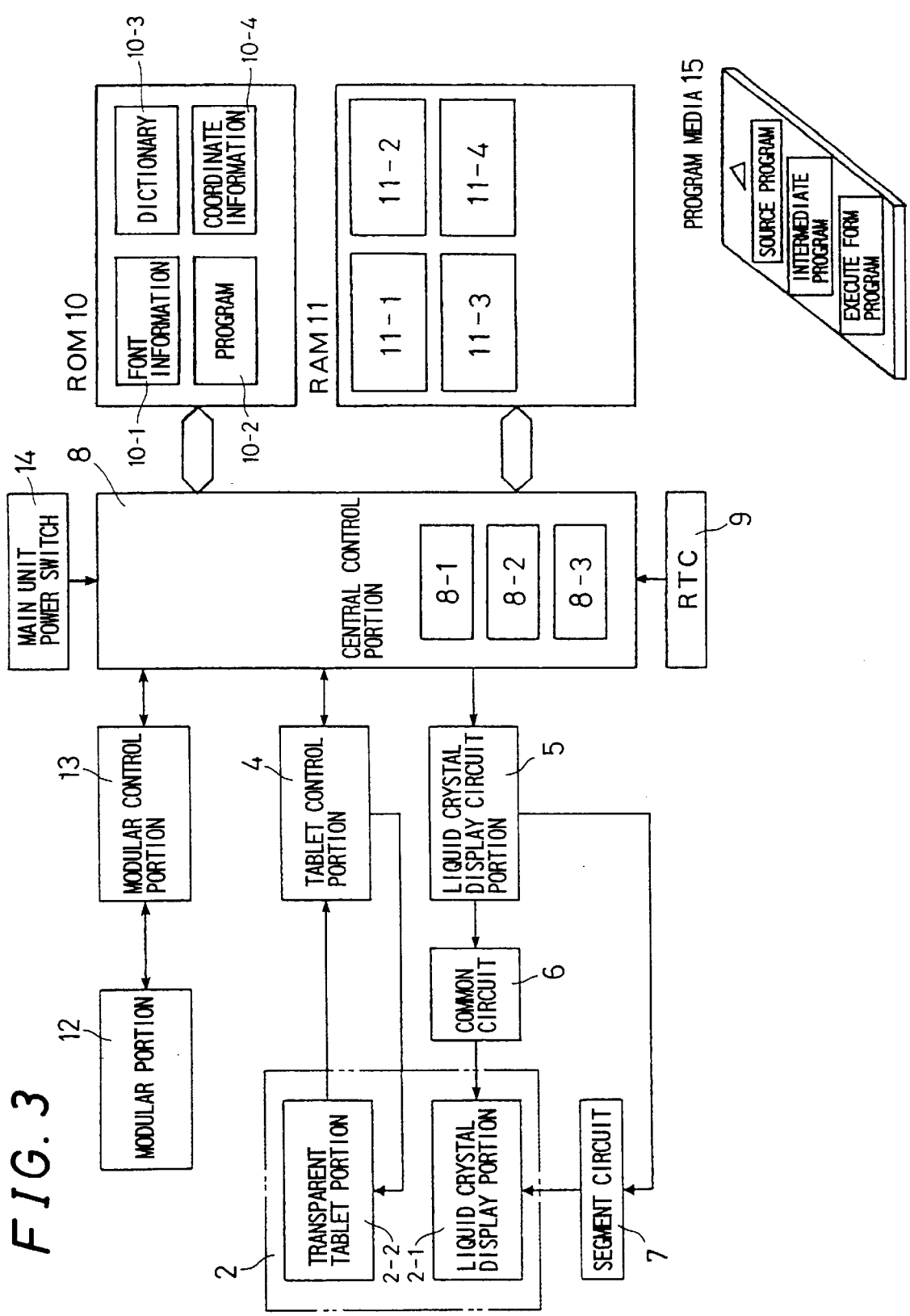
FIG. 3 is an overall block diagram of the information processing apparatus.

FIG. 3 is an overall block diagram of the information processing apparatus provided with a clipboard for text data and a clipboard for image data separately in accordance with the invention.

The liquid crystal display portion 2-1 and the transparent tablet portion 2-2 have already been described above, and they are not explained here.

A tablet control portion 4 is used to capture coordinate information from the transparent tablet portion 202, and is connected to the transparent electrodes provided on the transparent sheets of the transparent table portion 2-2. The coordinates of a position designated by a finger or a pen are detected when a contact occurs between the transparent electrodes.

A liquid crystal display circuit portion 5 stores as a bit map the positions of dots at which liquid crystals are lit, and sends signals to a common circuit 6 and a segment circuit 7 as required.

A central control portion 8 controls input information or output information by using various instructions. The central control portion 8 comprises a data capture control portion 8-1, a data type judgment portion 8-2 and a data paste control portion 8-3, which are detailed later referring to FIG. 10.

An RTC 9 keeps time on the basis of a clock signal from an oscillator (not shown), and delivers the current date and time.

A ROM (Read Only Memory) 10 comprises a font information area 10-1 storing character fonts to be displayed on the liquid crystal display portion 2-1, a program area 10-2 storing programs for designating the operations of the central control portion 8, a dictionary area 10-3 holding a dictionary for character conversion, and a coordinate information area 10-4 holding conversion information for converting coordinates detected by the tablet control portion 4 into coordinates corresponding to the display position.

A RAM (Random Access Memory) 11 comprises a data storage portion 11-1 storing a variety of data, such as text data and graphics data entered from the input/output portion 2 by the user, a program storage portion 11-2 which holds programs of a program media 15 when the program media 15 is installed in the main unit of the apparatus by using a program reading means (not shown), an image clipboard buffer 11-3 for storing image data, and a text clipboard buffer 11-4 for storing text data.

A modular portion 12 connected to a communication line performs transmission/reception of electronic mail and also performs data input/output on the Internet via a modular control portion 13.

A main unit power switch 14 is a switch for ON/OFF operation of the power supply of the main unit.

The program media 15 is an information recording medium configured separable with the main unit, and may be embodied, for example, as CD-ROM (Compact Disk ROM), a floppy disk, or an IC (Integrated Circuit) card. In the program media 15, execute form programs to be read and executed in the main unit, a source program capable of constructing the execute form programs, and intermediate programs are recorded.

When no program is installed beforehand in the main unit cabinet portion 1 of the main unit, programs and data required for implementing the invention are read from the program media 15 by using a program reading means (not shown). The data is stored in the data storage portion 11-1 of the RAM 11, and the program codes of the execution programs are stored in the program storage portion 11-2 of the RAM 11.

FIGS. 4A and 4B are tables showing the contents of the clipboard buffers 11-3, 11-4.

The number of data storable on each clipboard varies since the number is determined depending on the capacity of the RAM 11 and the quantity of each piece of data to be stored.

Furthermore, in the case where the remaining capacity in the RAM 11 is insufficient when an instruction for storing data on a clipboard is given, a required capacity is relieved from the storage area of the RAM 11 by deleting data beginning with oldest data, thereby reserving an area for storing new data.

In addition, when data storing a link destination in one of the clipboard buffers is deleted, data corresponding to the link destination in the other clipboard buffer is also deleted. However, even when only the data storing the link destination is deleted, the data associated with the deleted data in the other clipboard buffer may remain undeleted.

FIG. 4A is a table showing the contents of the image clipboard buffer 11-3. The image clipboard buffer 11-3 has a buffer number 11-3-1 wherein stored image data is numbered, an image data 11-3-2, an attribute information content 11-3-3 storing attribute information such as the file form, size (length and width) and pixel quantity of image data, and a link destination 11-3-4 stored incidentally and used as synchronous information for reading text data from the text clipboard buffer 11-4.

FIG. 4B is a table showing the contents of the text clipboard buffer 11-4. The text clipboard buffer 11-4 has a buffer number 11-4-1 wherein stored text data is numbered, a text data 11-4-2, an attribute information content 11-4-3 storing text attribute information such as the font, point and the like of text data, and a link destination 11-4-4 stored incidentally and used as synchronous information for reading image data from the image clipboard buffer 11-3.

The following descriptions will be given referring to FIGS. 5 to 10.

Figure 5:
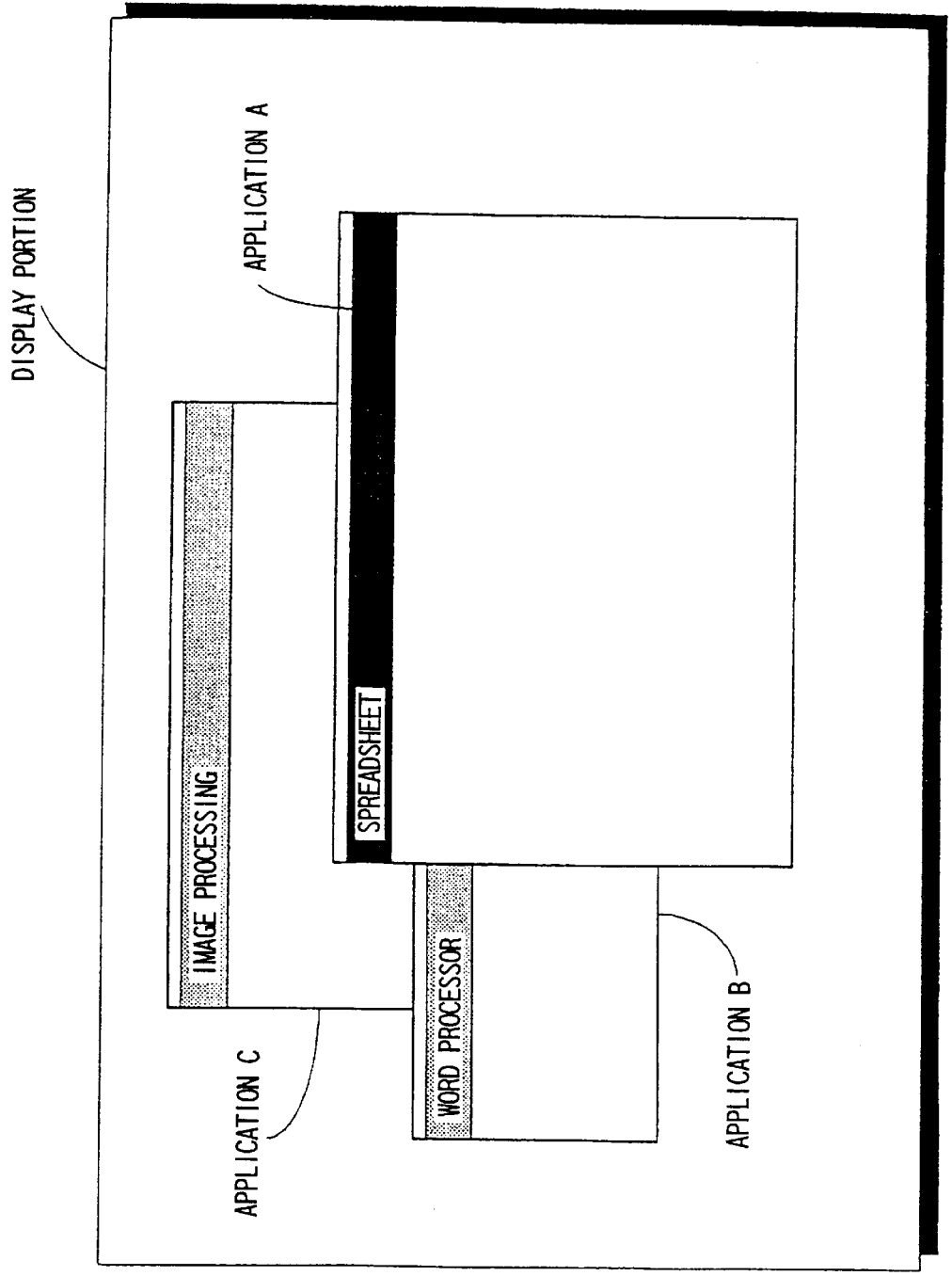
FIG. 5 is a view showing a display screen wherein plural applications are activated.

FIG. 5 is a view showing a display screen wherein plural applications are activated.

When documents are created by using an apparatus, plural applications are usually activated simultaneously on the input/output portion 2 as shown in FIG. 5 so that data can be processed in relation to one another.

In FIG. 5, a spreadsheet program is activated as application A, a word processor program is activated as application B, and an image processing program is activated as application C. The window for the spreadsheet is displayed uppermost, and is now active so that it can be processed.

Figure 6:
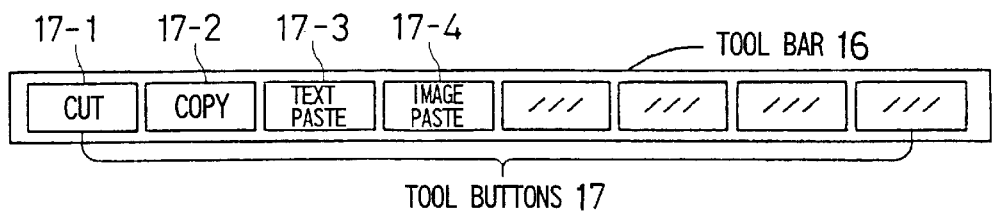
FIG. 6 is a view showing display examples of a tool bar 16 and tool buttons 17.

FIG. 6 is a view showing display examples of a tool bar 16 and tool buttons 17.

The tool bar 16 is an area for displaying the tool buttons 17 indicating various functions. The tool bar 16 can be disposed at any position on the display screen for ease of use by the user. Characters are written on the tool buttons so that the functions of the buttons can be understood clearly. However, simple symbols indicating processes or operations conducted by using the buttons are used usually.

The tool buttons 17 include a cut button 17-1 for cutting data, a copy button 17-2 for copying data, a text paste button 17-3 for pasting data of the text clipboard, an image paste button 17-4 for pasting data of the image clipboard, and the like.

Figure 7:
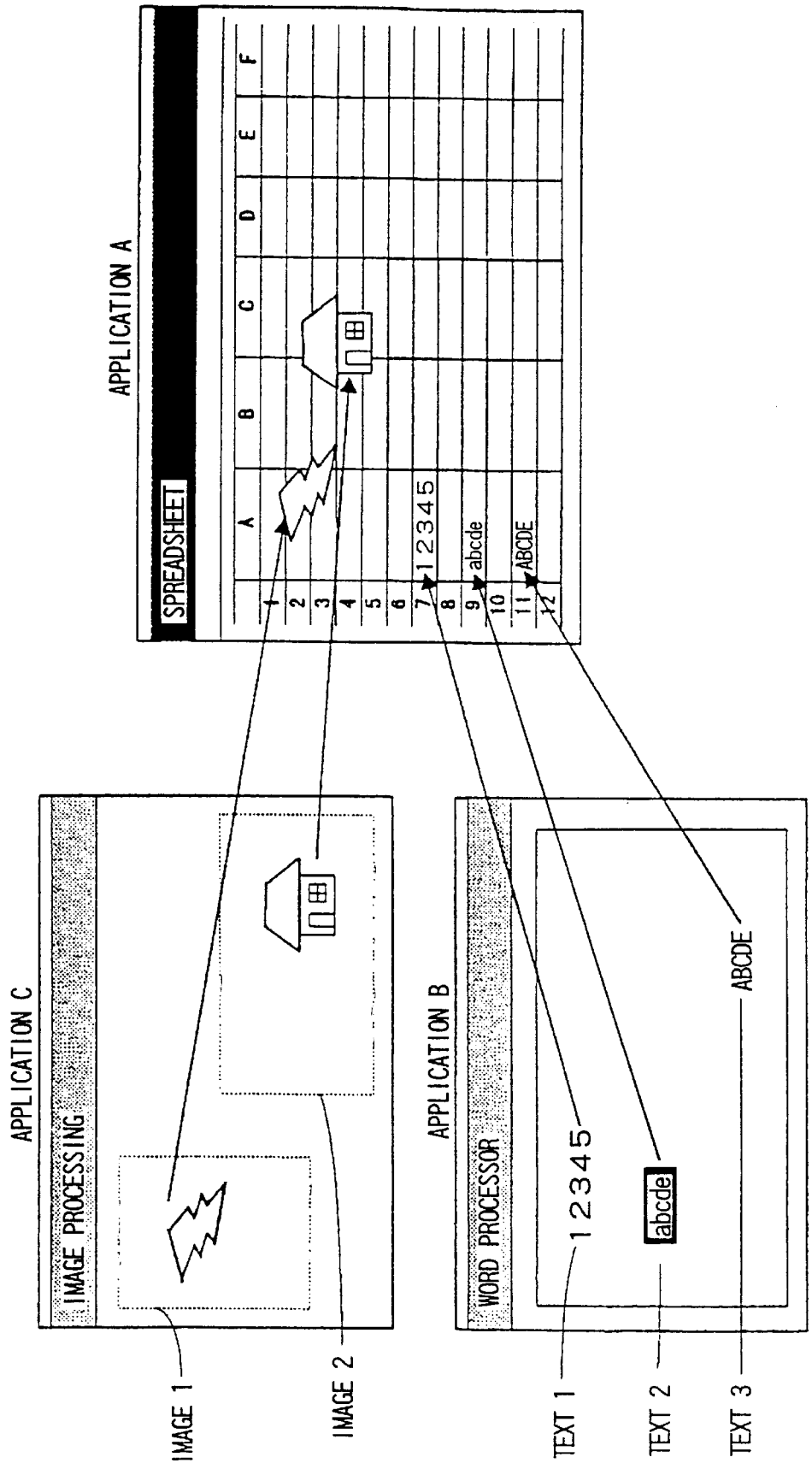
FIG. 7 is a view showing an example of data linkage on a screen.
Figures 8A, 8B:
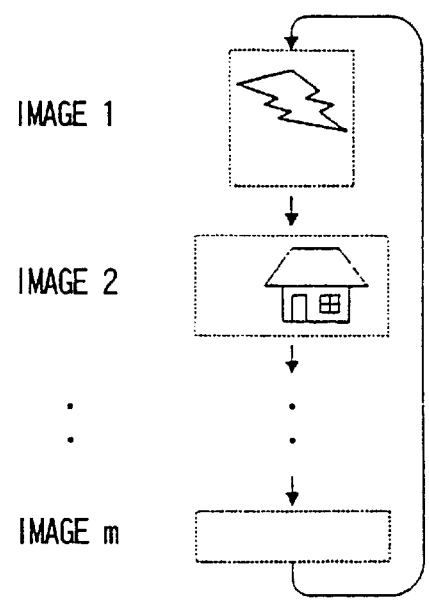
FIGS. 8A and 8B show a first display example at the time when the contents of the clipboards are pasted.
Figures 9A, 9B:
FIGS. 9A and 9B show a second display example at the time when the contents of the clipboards are pasted.

FIG. 7 is a view showing an example of data linkage on the screen. FIGS. 8A and 8B show a first display example at the time when the contents of the clipboards are pasted. FIGS. 9A and 9B show a second display example at the time when the contents of the clipboards are pasted. Referring to these figures, data linkage among the three applications in FIG. 5 will be described below. Applications to be linked are not limited to the three applications described above, but other applications may be used.

First, cut and copy operations will be described below referring to FIGS. 6 and 7.

For example, operations for cutting images 1 and 2 entered in the application C for image processing, for cutting text 1 to 3 entered in the application B used as a word processor and for pasting to use the images 1 and 2 and the text 1 to 3 on the application A used as a spreadsheet, shown in FIG. 7, will be described below.

First, the application C is designated to make it active, the region of the image 1 is selected by pen touch operation, and the cut button 17-1 of the tool bar 16 is touched. When the cut button 17-1 is touched, a buffer number 11-3-1 of "1" is stored, the data of the image 1 is stored as the image data 11-3-2, and the attribute information of the image 1 is stored as the attribute information content 11-3-3 of the image clipboard buffer 11-3 of the RAM 11. The image 1 displayed on the application C is deleted from the display screen showing the application C.

The image 2 is also deleted in the same way. The region of the image 2 is selected by pen touch operation, and the cut button 17-1 of the tool bar 16 is touched. A buffer number 11-3-1 of "2" is stored, the data of the image 2 is stored as the image data 11-3-2, and the attribute information of the image 2 is stored as the attribute information content 11-3-3 of the image clipboard buffer 11-3 of the RAM 11. The image 2 displayed on the application C is deleted from the display screen showing the application C.

Next, the application B is designated to make it active, the region of the text 1 is selected by dragging the pen, and the cut button 17-1 of the tool bar 16 is touched. When the cut button 17-1 is touched, a buffer number 11-4-1 of "1" is stored, the data of the text 1 is stored as the text data 11-4-2, and the attribute information of the text 1 is stored as the attribute information content 11-4-3 of the text clipboard buffer 11-4 of the RAM 11. The text 1 displayed on the application B is deleted from the display screen showing the application B.

The text 2 and the text 3 are also processed in the same way. That is, the regions of the text 2 and text 3 are selected, the cut button 17-1 is touched, and the corresponding data is stored in the text clipboard buffer 11-4 of the RAM 11.

FIG. 7 shows a condition wherein text data "abcde" is selected its region by dragging the pen.

In the case where both image data and text data are included in the selected region, the image data in the selected region is stored in the image clipboard buffer 11-3, and the text data in the selected region is stored in the text clipboard buffer 11-4. To establish linkage between the image data and the text data, the buffer numbers corresponding to the data are stored as link destinations.

In the case where the copy button 17-2, instead of the cut button 17-1, is touched, the selected data is stored in each clipboard buffer, and each piece of the data displayed on the applications B, C remains unchanged.

Next, the paste operation to be conducted after the above-mentioned cut or copy operation will be described below referring to FIGS. 6 to 9.

First, the application A is designated to make it active, and the text paste button 17-3 of the tool bar 16 is touched. When the text paste button 17-3 is touched, the contents of the text clipboard buffer 11-4 are displayed on the application A.

FIGS. 8A and 8B show a first display example at the time when the contents of the clipboards are pasted.

When the text paste button 17-3 is touched in the case of this display example, the data stored at the head of the text clipboard buffer 11-4 is first displayed on the application A as shown in FIG. 8A.

At this time, a judgment is made to determine whether the attribute information of the data stored in the text clipboard buffer 11-4 is effective on the application A or not. When the information is effective, display is carried out on the basis of the attribute information. When the attribute information is not compatible with that of the application A, only the text data on the basis of character codes is displayed.

When the displayed text data is the data desired to be pasted by the user, pasting is determined by designating the displayed text data by pen touch operation.

When the displayed text data is not the data desired to be pasted by the user, the user designates the text paste button 17-3 again. By this designation, the next data stored in the text clipboard buffer 11-4 is selected by switching and displayed.

Until the data desired to be pasted by the user is displayed, the text paste button 17-3 is designated repeatedly. In the case where the text paste button 17-3 is designated again when the n-th data, the last data stored in the text clipboard buffer 11-4, is displayed, the first data is displayed again.

Furthermore, when the image paste button 17-4 is designated, the contents of the image clipboard buffer 11-3 are displayed in turn on the application A in the same way as shown in FIG. 8B.

At this time, a judgment is made to determine whether the attribute information of the data stored in the image clipboard buffer 11-3 is effective on the application A or not. When the information is effective, display is carried out in accordance with the format on the basis of the attribute information. When the data format included in the attribute information is not compatible with that of the application A, an alarm message "Pasting cannot be done because the file format is not compatible" is displayed.

In the case where linkage has been established between the image data and text data of the data determined to be pasted, the data corresponding thereto is extracted on the basis of the buffer number having been stored in the link destinations 11-3-4, 11-4-4 of the determined data, and then pasted simultaneously.

FIGS. 9A and 9B show a second display example at the time when the contents of the clipboards are pasted.

When the text paste button 17-3 is touched in the case of this display example, the data stored in the text clipboard buffer 11-4 is displayed on the application A using a table as shown in FIG. 9A.

At this time, a judgment is made to determine whether the attribute information of the data stored in the text clipboard buffer 11-4 is effective on the application A or not. When the information is effective, display is carried out on the basis of the attribute information. When the attribute information is not compatible with that of the application A, only the text data on the basis of character codes is displayed.

By pen touch operation, the user selects data desired to be pasted from among the displayed text data. Pasting is determined by designating the data by pen touch operation.

When the image paste button 17-4 is designated by pen touch operation, the data stored in the image clipboard buffer 11-3 is displayed using a table as shown in FIG. 9B, and the desired data is selected and designated by pen touch operation in the same way.

FIG. 9A shows that text data "abcde" is selected, and FIG. 9B shows that image data "house" is selected.

When the data stored in the image clipboard buffer 11-3 is displayed by using a table, a judgement is made to determine whether the attribute information of the data stored in the image clipboard buffer 11-3 is effective on the application A or not. When the information is effective, display is carried out on the basis of the attribute information. When the attribute information is not compatible with that of the application A, an alarm message "Pasting cannot be done because the file format is not compatible" is displayed.

In the case where linkage has been established between the image data and text data of the data determined to be pasted, the data corresponding thereto is extracted on the basis of the buffer number having been stored in the link destinations 11-3-4, 11-4-4 of the determined data, and then pasted simultaneously.

Pen touch operations have been used to select regions and to operate tool buttons in the above-mentioned descriptions. However, other pointing devices, such as a mouse, may be used.

Figure 10:
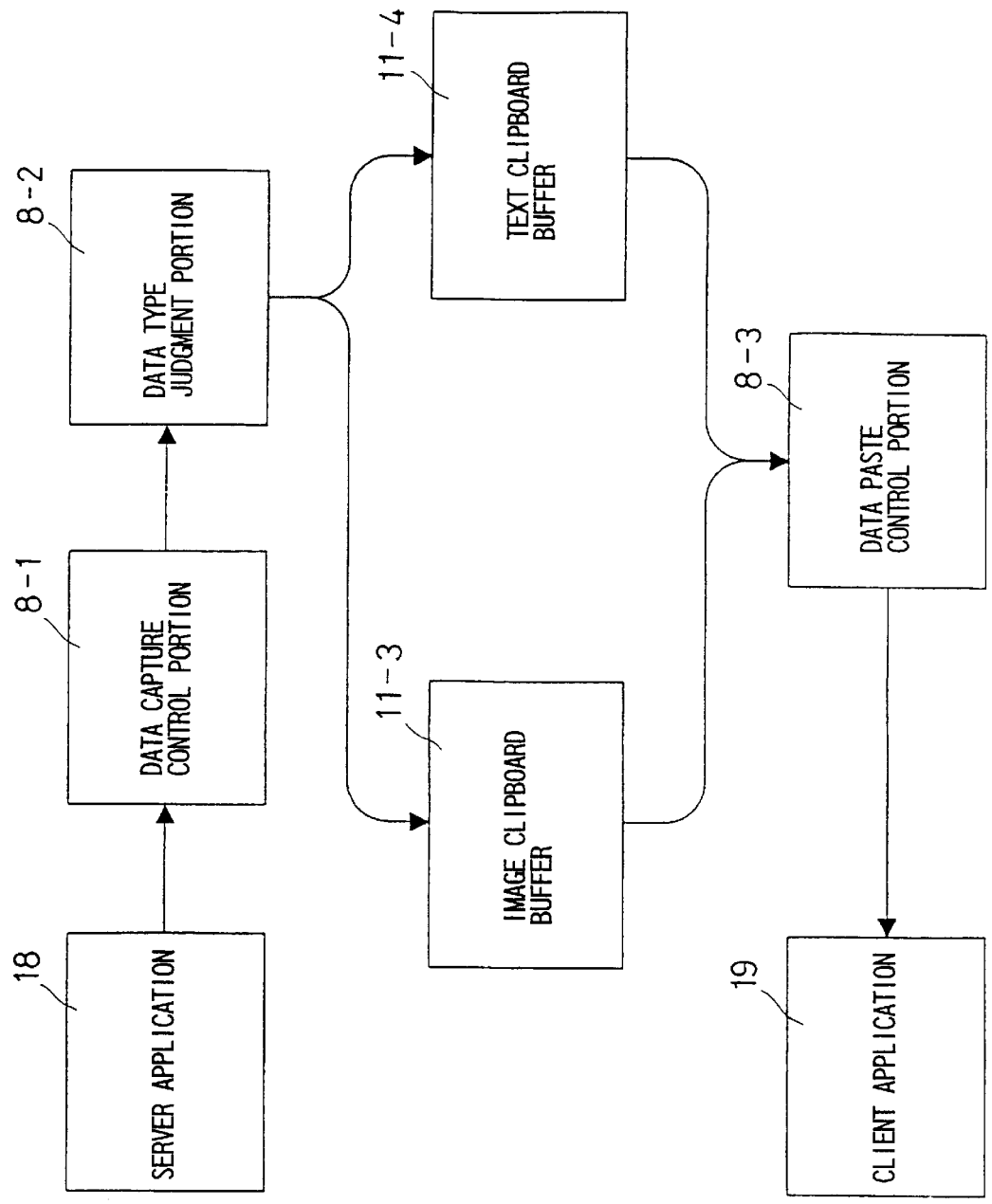
FIG. 10 is a block diagram showing processing for the information processing apparatus.

FIG. 10 is a block diagram showing processing for performing the above-mentioned operations.

After the region of image data, text data or the like is selected and designated on a server application 18, when the cut button 17-1 or the copy button 17-2 is touched, a signal is delivered to the central control portion 8, and the selected region of the data is captured by the data capture control portion 8-1. When the cut button 17-1 was designated at the server application 18, the data capture control portion 8-1 captures the selected region of the data, and the selected region of the data is deleted from the server application 18.

The data captured by the data capture control portion 8-1 is delivered to a data type judgment portion 8-2. The data type judgment portion 8-2 judges whether the captured data is image data or text data. When the captured data is image data, the data is stored together with its buffer number and its attribute information in the image clipboard buffer 11-3 of the RAM 11. When the captured data is text data, the data is stored together with its buffer number and its attribute information in the text clipboard buffer 11-4 of the RAM 11.

Next, when the text paste button 17-3 or the image paste button 17-4 is touched on a client application 19, a signal is delivered to the central control portion 8. The data paste control portion 8-3 of the central control portion 8 judges whether the text paste button 17-3 or the image paste button 17-4 is touched. When the text paste button 17-3 is touched, data is read from the text clipboard buffer 11-4 of the RAM 11.

At this time, a judgment is made to determine whether the attribute information of the data having been read is effective on the client application or not. When the attribute information is effective, display is carried out on the basis of the attribute information. When the attribute information is not compatible with that of the client application, text data on the basis of character codes is displayed.

When the image paste button 17-4 was touched, data is read from the image clipboard buffer 11-3 of the RAM 11. At this time, a judgment is made to determine whether the attribute information of the data stored in the image clipboard buffer 11-3 is effective on the client application or not. When the attribute information is effective, display is performed on the basis of the attribute information. When the attribute information is not compatible with that of the client application, an alarm message "Pasting cannot be done because the file format is not compatible" is displayed.

The processes regarding the above-mentioned operations will be described below referring to flowcharts shown in FIGS. 11 to 13.

Figure 11:
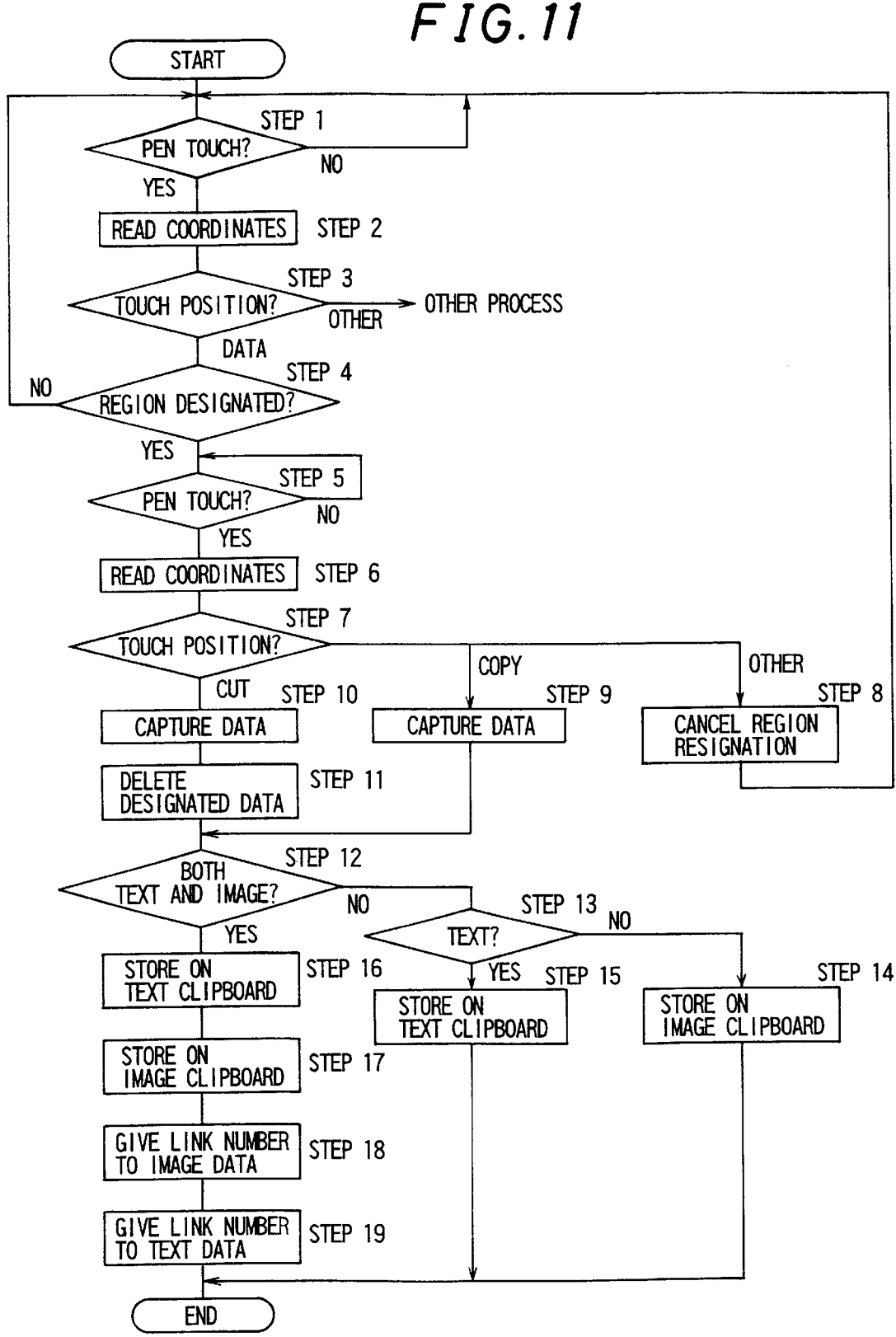
FIG. 11 is a flowchart showing cut and copy processes.

FIG. 11 is a flowchart showing cut and copy processes.

First, program control waits for pen touch on the input/output portion 2 at step 1. When the input/output portion 2 is touched with the input pen, the coordinates of the touch position are read at step 2, and a judgment is made at step 3 to determine where the pen touch position is. When the pen touch position is a position where data is present, a judgment is made at step 4 to determine whether the region of the data has been designated or not. When the pen touch position is a position other than the region of data, a process corresponding to the position, the other process is carried out.

When no region has been designated, program control returns to step 1. When the region of the data has been designated, program control waits at step 5 until the input/output portion 2 is touched with the pen.

When the input/output portion 2 is touched with the input pen, the coordinates of the touch position are read at step 6, and a judgment is made at step 7 to determine where the pen touch position is.

When the pen touch position is a position other than the position of the cut button 17-1 or the copy button 17-2, the designation of the region of the data is canceled at step 8, and program control returns to step 1. When the pen touch position is the position of the copy button 17-2, the designated region of the data is captured by the data capture control portion 8-1 at step 9, and program control proceeds to step 12. Alternatively, when the pen touch position is the position of the cut button 17-1, the designated region of the data is captured by the data capture control portion 8-1 at step 10, and the designated region of the data is deleted from the application at step 11. Program control then proceeds to step 12.

A judgment is made at step 12 to determine whether the data captured at step 9 or 10 includes both text data and image data or not. When the captured data includes either text data or image data, a judgment is made at step 13 to determine whether the data is text data or not.

When the captured data is not text data, the captured image data is stored in the image clipboard buffer 11-3 of the RAM 11 at step 14. When the captured data is text data, the captured text data is stored in the text clipboard buffer 11-4 of the RAM 11 at step 15.

When the captured data includes both text data and image data as the result of the judgment at step 12, the text data of the captured data is stored together with its buffer number and its attribute information in the text clipboard buffer 11-4 of the RAM 11 at step 16, and the image data is stored together with its buffer number and its attribute information in the image clipboard buffer 11-3 of the RAM 11 at step 17.

At step 18, the content of the buffer number 11-3-1 corresponding to the image data stored at step 17 is stored in the link destination 11-4-4 of the text clipboard buffer 11-4. At step 19, the content of the buffer number 11-4-1 corresponding to the text data stored at step 16 is stored in the link destination 11-3-4 of the image clipboard buffer 11-3.

By the above-mentioned process, a cut or copy process can be carried out.

Figure 12:
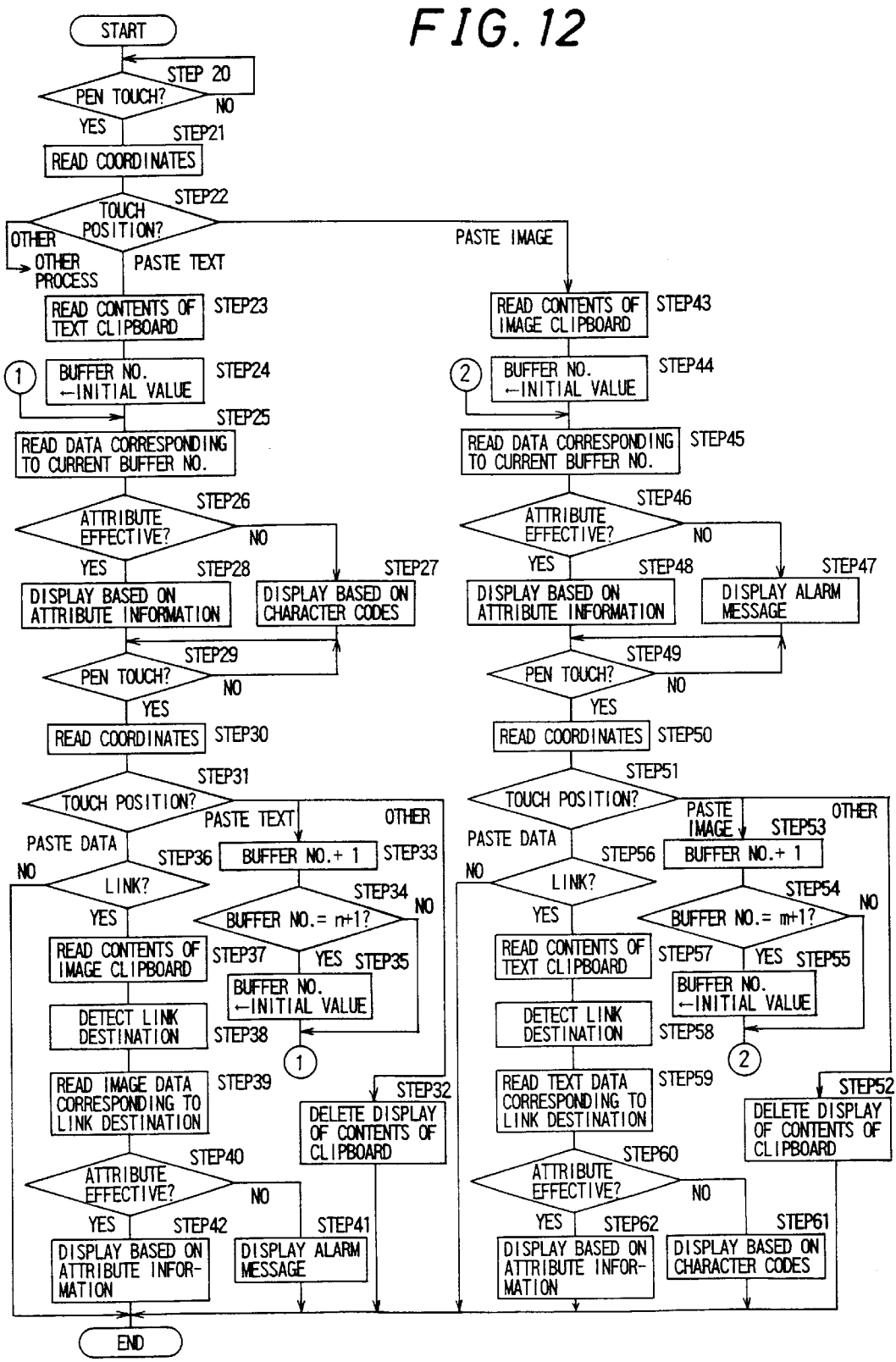
FIG. 12 is a flowchart showing a process for the first display example at the time when the contents of the clipboard are pasted.

FIG. 12 is a flowchart showing a process for the first display example at the time when the contents of the clipboard are pasted.

First, program control waits for pen touch on the input/output portion 2 at step 20. When the input/output portion 2 is touched with the input pen, the coordinates of the touch position are read at step 21, and a judgment is made at step 22 to determine where the pen touch position is.

When the pen touch position is the position of the text paste button 17-3 of the tool bar 16, the contents of the text clipboard buffer 11-4 of the RAM 11 are read in the data paste control portion 8-3 at step 23. At step 24, the buffer number of the first data is stored as an initial value of the counter buffer number.

At step 25, the data of the buffer number corresponding to the current counter buffer number is read. At step 26, a judgment is made to determine whether the attribute information content 11-4-3 of the text clipboard buffer 11-4, which has been read, is effective or not at the application being active currently.

When the attribute information content 11-4-3 of the text clipboard buffer 11-4, which has been read, is not effective on the application being active currently, only the text data on the basis of character codes is displayed at step 27. Program control then proceeds to step 29.

When the attribute information content 11-4-3 of the text clipboard buffer 11-4, which has been read, is effective on the application being active currently, the data having been read is displayed on the basis of the attribute information at step 28. Even if all the attributes included in the attribute information content 11-4-3 are not effective, display may be carried out on the basis of effective attributes only. Program control then proceeds to step 29.

Next, program control waits for pen touch on the input/output portion 2 at step 29. When the input/output portion 2 is touched with the input pen, the coordinates of the touch position are read at step 30, and a judgment is made at step 31 to determine where the pen touch position is.

When the pen touch position is a position other than the position of the data displayed at step 27 or 28, or the position of the text paste button 17-3, the data displayed at step 27 or 28 is deleted at step 32, and the process is ended.

When the pen touch position is the position of the text paste button 17-3, the counter buffer number is incremented at step 33. At step 34, a judgment is made to determine whether the counter buffer number is "n+1" or not.

When the counter buffer number is "n+1," the initial value obtained at step 24 is stored in the counter buffer number at step 35 to display the paste data again from its beginning, and program control returns to step 25. When the counter buffer number is not "n+1," program control just returns to step 25.

When the pen touch position is the position of the paste data displayed at step 27 or 28, a judgment is made at step 36 to determine whether link data is included in the image clipboard buffer 11-3 or not by checking the link destination 11-4-4 of the data having been read.

When no link data is included, the process is ended. When link data is included, the contents of the image clipboard buffer 11-3 of the RAM 11 are read in the data paste control portion 8-3 at step 37. At step 38, the image data of the buffer number 11-3-1 coincident with the link destination 11-4-4 of the text clipboard buffer 11-4 is detected from the image clipboard buffer 11-3 having been read at step 37.

At step 39, the image data detected at step 38 is read. At step 40, a judgment is made to determine whether the attribute information content 11-3-3 of the image clipboard buffer 11-3, which has been read, is effective or not on the application being active currently.

When the attribute information content 11-3-3 of the image clipboard buffer 11-3, which has been read, is not effective on the application being active currently, an alarm message "Pasting cannot be done because the file format is not compatible" is displayed at step 41, and the process is ended.

When the attribute information content 11-3-3 of the image clipboard buffer 11-3, which has been read, is effective on the application being active currently, the data having been read is displayed on the basis of the attribute information at step 42, and the process is ended.

When the pen touch position is the position of the image paste button 17-4 of the tool bar 16, the contents of the image clipboard buffer 11-3 of the RAM 11 are read in the data paste control portion 8-3 at step 43. At step 44, the buffer number of the first data is stored as an initial value of the counter buffer number.

At step 45, the data of the buffer number corresponding to the current counter buffer number is read. At step 46, a judgment is made to determine whether the attribute information content 11-3-3 of the image clipboard buffer 11-3, which has been read, is effective or not on the application being active currently.

When the attribute information content 11-3-3 of the image clipboard buffer 11-3, which has been read, is not effective on the application being active currently, an alarm message "Pasting cannot be done because the file format is not compatible" is displayed at step 47. Program control then proceeds to step 49.

When the attribute information content 11-3-3 of the image clipboard buffer 11-3, which has been read, is effective on the application being active currently, the data having been read is displayed on the basis of the attribute information at step 48. Even if all the attributes included in the attribute information content 11-3-3 are not effective, display may be carried out on the basis of effective attributes only. Program control then proceeds to step 49.

Next, program control waits for pen touch on the input/output portion 2 at step 49. When the input/output portion 2 is touched with the input pen, the coordinates of the touch position are read at step 50, and a judgment is made at step 51 to determine where the pen touch position is.

When the pen touch position is a position other than the position of the data displayed at step 47 or 48, or the position of the image paste button 17-4, the data displayed at step 47 or 48 is deleted at step 52, and the process is ended.

When the pen touch position is the position of the image paste button 17-4, the counter buffer number is incremented at step 53. At step 54, a judgment is made to determine whether the counter buffer number is "m+1" or not.

When the counter buffer number is "m+1," the initial value obtained at step 44 is stored in the counter buffer number at step 55 to display again the paste data from its beginning, and program control returns to step 45. When the counter buffer number is not "m+1," program control just returns to step 45.

When the pen touch position is the position of the paste data displayed at step 47 or 48, a judgment is made at step 56 to determine whether link data is included in the text clipboard buffer 11-4 or not by checking the link destination 11-3-4 of the data having been read.

When no link data is included, the process is ended. When link data is included, the contents of the text clipboard buffer 11-4 of the RAM 11 are read in the data paste control portion 8-3 at step 57. At step 58, the text data of the buffer number 11-4-1 coincident with the link destination 11-3-4 of the image clipboard buffer 11-3 is detected from the text clipboard buffer 11-4 having been read at step 57.

At step 59, the text data detected at step 58 is read. At step 60, a judgment is made to determine whether the attribute information content 11-4-3 of the text clipboard buffer 114, which has been read, is effective or not at the application being active currently.

When the attribute information content 11-4-3 of the text clipboard buffer 11-4, which has been read, is not effective on the application being active currently, only the text data on the basis of character codes is displayed at step 61, and the process is ended.

When the attribute information content 11-4-3 of the text clipboard buffer 11-4, which has been read, is effective on the application being active currently, the data having been read is displayed on the basis of the attribute information at step 62, and the process is ended.

Figure 13:
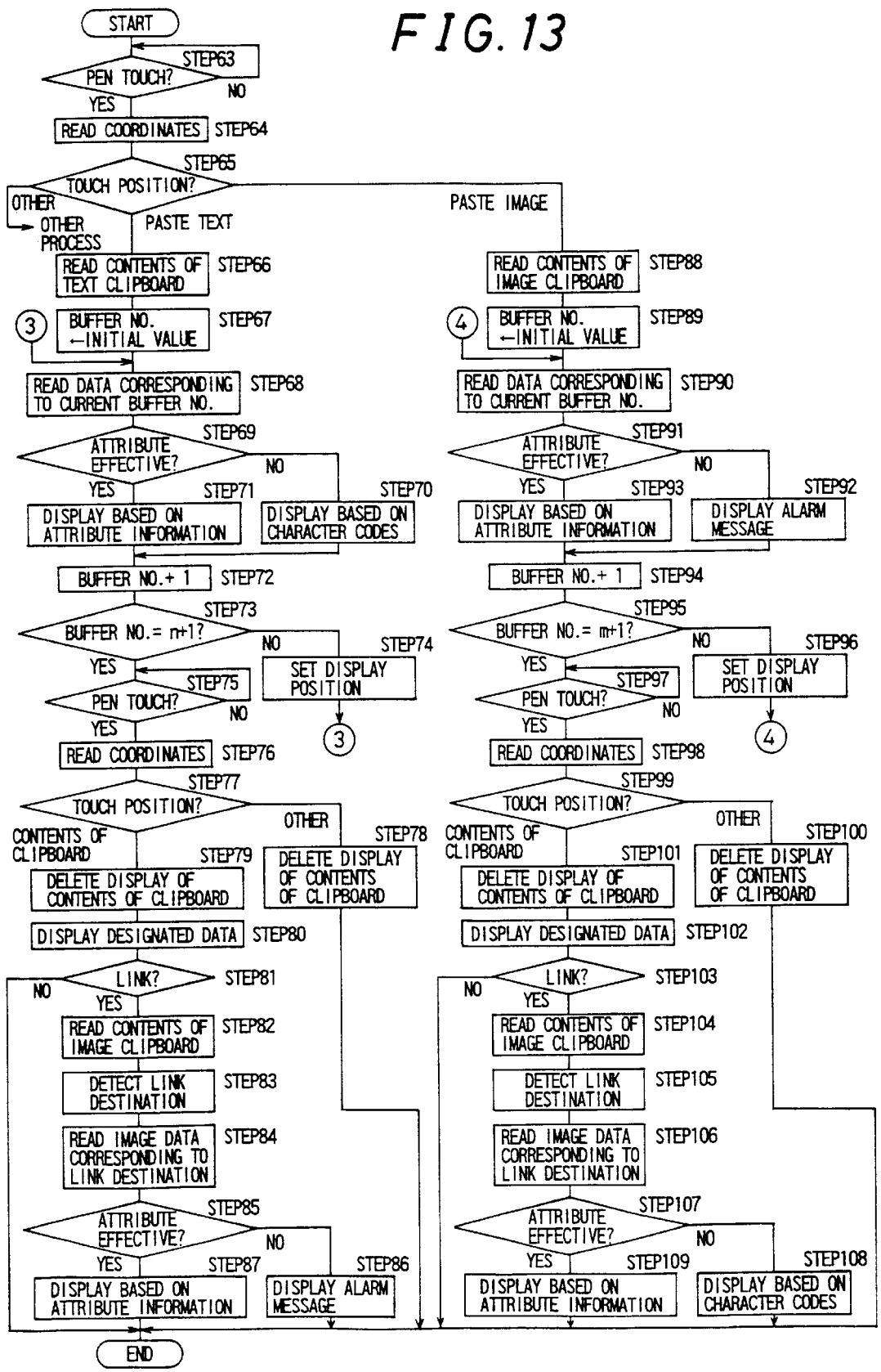
FIG. 13 is a flowchart showing a process for the second display example at the time when the contents of the clipboard are pasted.

FIG. 13 is a flowchart showing a process for the second display example at the time when the contents of the clipboard are pasted.

First, program control waits for pen touch on the input/output portion 2 at step 63. When the input/output portion 2 is touched with the input pen, the coordinates of the touch position are read at step 64, and a judgment is made at step 65 to determine where the pen touch position is.

When the pen touch position is the position of the text paste button 17-3 of the tool bar 16, the contents of the text clipboard buffer 11-4 of the RAM 11 are read in the data paste control portion 8-3 at step 66. At step 67, the buffer number of the first data is stored as an initial value of the counter buffer number.

At step 68, the data of the buffer number corresponding to the current counter buffer number is read. At step 69, a judgment is made to determine whether the attribute information content 11-4-3 of the text clipboard buffer 11-4, which has been read, is effective or not on the application being active currently.

When the attribute information content 11-4-3 of the text clipboard buffer 11-4, which has been read, is not effective on the application being active currently, only the text data on the basis of character codes is displayed at step 70. Program control then proceeds to step 72.

When the attribute information content 11-4-3 of the text clipboard buffer 11-4, which has been read, is effective on the application being active currently, the data having been read is displayed on the basis of the attribute information at step 71. Even if all the attributes included in the attribute information content 11-4-3 are not effective, display may be carried out on the basis of effective attributes only. Program control then proceeds to step 72.

Next, the counter buffer number is incremented at step 72. At step 73, a judgment is made to determine whether the counter buffer number is "n+1" or not.

When the counter buffer number is not "n+1," the position of the paste data to be displayed next is set at step 74, and program control returns to step 68. The process from step 68 to step 74 is repeated until all of the data stored on the clipboard are displayed.

Program control waits for pen touch on the input/output portion 2 at step 75. When the input/output portion 2 is touched with the input pen, the coordinates of the touch position are read at step 76, and a judgment is made at step 77 to determine where the pen touch position is.

When the pen touch position is a position other than the position of the data displayed at step 70 or 71, the contents of the clipboard displayed at step 70 or 71 are deleted at step 78, and the process is ended.

When the pen touch position is the position of the paste data displayed at step 70 or 71, the displayed contents of the clipboard are deleted at step 79, and only the designated data obtained by pen touch at step 75 is displayed at step 80.

A judgment is made at step 81 to determine whether link data is included in the image clipboard buffer 11-3 or not by checking the link destination 11-4-4 of the designated data.

When no link data is included, the process is ended. When link data is included, the contents of the image clipboard buffer 11-3 of the RAM 11 are read in the data paste control portion 8-3 at step 82. At step 83, the image data of the buffer number 11-3-1 coincident with the link destination 11-4-4 of the text clipboard buffer 11-4 is detected from the image clipboard buffer 11-3 having been read at step 82.

At step 84, the image data detected at step 83 is read. At step 85, a judgment is made to determine whether the attribute information content 11-3-3 of the image clipboard buffer 11-3, which has been read, is effective or not on the application being active currently.

When the attribute information content 11-3-3 of the image clipboard buffer 11-3, which has been read, is not effective on the application being active currently, an alarm message "Pasting cannot be done because the file format is not compatible" is displayed at step 86, and the process is ended.

When the attribute information content 11-3-3 of the image clipboard buffer 11-3, which has been read, is effective on the application being active currently, the data having been read is displayed on the basis of the attribute information at step 87, and the process is ended.

When the pen touch position is the position of the image paste button 17-4 of the tool bar 16, the contents of the image clipboard buffer 11-3 of the RAM 11 are read in the data paste control portion 8-3 at step 88. At step 89, the buffer number of the first data is stored as an initial value of the counter buffer number.

At step 90, the data of the buffer number corresponding to the current counter buffer number is read. At step 91, a judgment is made to determine whether the attribute information content 11-3-3 of the image clipboard buffer 11-3, which has been read, is effective or not on the application being active currently.

When the attribute information content 11-3-3 of the image clipboard buffer 11-3, which has been read, is not effective on the application being active currently, an alarm message "Pasting cannot be done because the file format is not compatible" is displayed at step 92, and program control proceeds to step 94.

When the attribute information content 11-3-3 of the image clipboard buffer 11-3, which has been read, is effective on the application being active currently, the data having been read is displayed on the basis of the attribute information at step 93. Even if all the attributes included in the attribute information content 11-3-3 are not effective, display may be carried out on the basis of effective attributes only. Program control then proceeds to step 94.

Next, the counter buffer number is incremented at step 94. At step 95, a judgment is made to determine whether the counter buffer number is "m+1" or not.

When the counter buffer number is not "m+1," the position of the paste data to be displayed next is set at step 96, and program control returns to step 90. The process from step 90 to step 96 is repeated until all of the data stored on the clipboard are displayed.

Program control waits for pen touch on the input/output portion 2 at step 97. When the input/output portion 2 is touched with the input pen, the coordinates of the touch position are read at step 98, and a judgment is made at step 99 to determine where the pen touch position is.

When the pen touch position is a position other than the position of the data displayed at step 92 or 93, the contents of the clipboard displayed at step 92 or 93 is deleted at step 100, and the process is ended.

When the pen touch position is the position of the paste data displayed at step 92 or 93, the displayed contents of the clipboard are deleted at step 101, and only the designated data obtained by pen touch at step 97 is displayed at step 102.

A judgment is made at step 103 to determine whether link data is included in the text clipboard buffer 11-4 or not by checking the link destination 11-3-4 of the designated data.

When no link data is included, the process is ended. When link data is included, the contents of the text clipboard buffer 11-4 of the RAM 11 are read in the data paste control portion 8-3 at step 104. At step 105, the text data of the buffer number 11-4-1 coincident with the link destination 11-3-4 of the image clipboard buffer 11-3 is detected from the text clipboard buffer 11-4 having been read at step 104.

At step 106, the text data detected at step 105 is read. At step 107, a judgment is made to determine whether the attribute information content 11-4-3 of the text clipboard buffer 11-4, which has been read, is effective or not on the application being active currently.

When the attribute information content 11-4-3 of the text clipboard buffer 11-4, which has been read, is not effective on the application being active currently, only the text data on the basis of character codes is displayed at step 108, and the process is ended.

When the attribute information content 11-4-3 of the text clipboard buffer 11-4, which has been read, is effective on the application being active currently, the data having been read is displayed on the basis of the attribute information at step 109, and the process is ended.

Even in the case where data including both image data and text data is pasted, the display at the time of paste data selection remains unchanged. However, when data including both image data and text data is pasted, a notice meaning that another type of data corresponding thereto is available may be displayed.

By the above-mentioned processes, data can be edited by using separate clipboards for image data and text data.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An information processing apparatus capable of carrying out data linkage among a plurality of activated applications, the apparatus comprising:

designating device for designating data desired to be stored on an activated application which is currently in execution;

judging circuit for judging whether the data designated by the designating device comprises any one of text data, image data, and text and image data;

storage circuit for storing a plurality of pieces of data in accordance with the basis of a result of the judgement by the judging circuit, said text data being stored in a text buffer, said image data being stored in an image buffer and said text and image data being respectively stored separately in said text and image buffers together with linking information to each other;

selecting device for selecting a desired data from among the plurality of pieces of data stored in the storage circuit; and reading circuit for reading the data selected by the selecting device on another activated application desired to be linked.

2. The information processing apparatus of claim 1, wherein the storage circuit stores data in the order of storage designated by the designating device.

3. The information processing apparatus of claim 2, further comprising:

deleting circuit for deleting data stored in the storage circuit, in chronological order from the oldest data, when a residual of storage capacity of the storage circuit becomes insufficient.

4. The information processing apparatus of claim 1, further comprising:

dividing circuit for dividing the data designated by the designating device by type of data when the designated data is judged as including a plurality of pieces of data by the judging circuit, wherein the storage circuit stores the plurality of pieces of divided data by type of data together with information for synchronization among the data.

5. The information processing apparatus of claim 4, further comprising:

deleting circuit for deleting data stored in the storage circuit, the deleting circuit, when specific data is deleted, also deleting a different type of data specified by the synchronization information of the deleted specific data.

6. The information processing apparatus of claim 4, further comprising:

deleting circuit for deleting data stored in the storage circuit, the deleting circuit, when specific data is deleted, not deleting a different type of data specified by the synchronization information of the deleted specific data.

7. A method of information processing for establishing data linkage among plural activated application, said method comprising:

designating data desired to be stored on an activated application which is currently in execution;

judging whether the data designated at the designating data step comprises any one of text data, image data, and text and image data;

storing a plurality of pieces of data in accordance with the basis of a result of the judgement at the judging step, said text data being stored in a text buffer, said image data being stored in an image buffer and said text and image data being respectively stored separately in said text and image buffers together with linking information to each other;

selecting a desired data from among the plurality of pieces of data stored at the storing step; and reading the data selected at the selecting step on another activated application desired to be linked.

8. The method of information processing of claim 7, further comprising:

a step of dividing the data designated at the designating step by type of the data when the designated data is judged as including a plurality of pieces of data at the judging step, wherein the storing step stores a plurality of pieces of divided data by type of data together with information for synchronization among the data.

9. A recording medium stored with an information processing program, readable by a computer, for establishing data linkage among a plurality of activated application, the recording medium being stored with a program for making a computer execute a method of information processing, said method comprising:

designating data desired to be stored on an activated application which is currently in execution;

judging whether the date designated at the designating data step comprises any one of text data, image data, and text and image data;

storing a plurality of pieces of data in accordance with a judgment result at the judging step, said text data being stored in a text buffer, said image data being stored in an image buffer and said text and image data being respectively stored separately in said text and image buffers together with linking information to each other;

selecting a desired data from among the plurality of pieces of data stored at the storing step; and reading the data selected at the selecting step on another activated application desired to be linked.

10. A recording medium, readable by a computer, stored with an information processing programs for establishing data linkage among plural activated applications, the recording medium being stored with a program for making a computer execute a method of information processing, said method comprising:

designating data desired to be stored on an activated application which is currently in execution;

judging whether the data designated at the designating data step comprises any one of text data, image data, and text and image data;

dividing the data designated at the designating step by type of the data, when the designated data is judged to include plural pieces of data at the judging step;

storing a plurality of pieces of divided data by type of data together with information for synchronization among the data, said text data being stored in a text buffer, said image data being stored in an image buffer and said text and image data being respectively stored separately in said text and image buffers together with linking information to each other;

selecting a desired data from among the plurality of pieces of data stored at the storing step; and reading the data selected at the selecting step on another activated application desired to be linked.

* * * * *